(12) United States Patent
Boettcher (10) Patent No.: US 8,473,082 B2
(45) Date of Patent: Jun. 25, 2013

(54) PORTABLE MEDIA PLAYBACK DEVICE INCLUDING USER INTERFACE EVENT PASSTHROUGH TO NON-MEDIA-PLAYBACK PROCESSING

(75) Inventor: Jesse Boettcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 550 days.

(21) Appl. No.: 12/764,352

(22) Filed: Apr. 21, 2010

(65) Prior Publication Data

US 2010/0205531 A1 Aug. 12, 2010

Related U.S. Application Data

(63) Continuation of application No. 11/530,773, filed on Sep. 11, 2006, now Pat. No. 7,729,791.

(51) Int. Cl.
*G06F 17/00* (2006.01)
(52) U.S. Cl.
USPC .......................................................... 700/94
(58) Field of Classification Search
USPC .... 700/94; 713/100; 704/500–504; 369/1–12
See application file for complete search history.

(56) References Cited

U.S. PATENT DOCUMENTS

| | | | |
|---|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,379,057 A | 1/1995 | Clough |

(Continued)

FOREIGN PATENT DOCUMENTS

| | | |
|---|---|---|
| DE | 43 34 773 A1 | 4/1994 |
| DE | 44 45 023 A1 | 6/1996 |

(Continued)

OTHER PUBLICATIONS

Decision to Grant in Chinese Patent Application No. 200780029672.3 dated Jun. 6, 2012.

(Continued)

*Primary Examiner* — Andrew C Flanders
(74) *Attorney, Agent, or Firm* — Blakely, Sokoloff, Taylor & Zafman LLP (57) ABSTRACT

A method of operating a portable electronics device can include integrated operation of media playback processing and non-media-playback processing (such as, for example, a game). The method can include receiving an event corresponding to operation of a user interface item by a user of the portable electronics device. The received event can be provided to the non-media-playback processing. The non-media-playback processing can determine whether to cause an action corresponding to the provided received event with respect to the non-media-playback processing. For an event determined by the non-media-playback processing to not cause an action corresponding to the provided received event with respect to the non-media-playback processing, the provided received event can be provided to the media playback processing. Typically, the operating performed by the media playback processing based on the event can be the processing that would otherwise be performed by the media playback processing if the non-media-playback processing was not even occurring.

42 Claims, 2 Drawing Sheets

U.S. PATENT DOCUMENTS

| | | | |
|---|---|---|---|
| 5,406,305 | A | 4/1995 | Shimomura et al. |
| 5,559,945 | A | 9/1996 | Beaudet et al. |
| 5,566,337 | A | 10/1996 | Szymanski et al. |
| 5,583,993 | A | 12/1996 | Foster et al. |
| 5,608,698 | A | 3/1997 | Yamanoi et al. |
| 5,616,876 | A | 4/1997 | Cluts |
| 5,617,386 | A | 4/1997 | Choi |
| 5,670,985 | A | 9/1997 | Cappels, Sr. et al. |
| 5,675,362 | A | 10/1997 | Clough |
| 5,684,513 | A | 11/1997 | Decker |
| 5,710,922 | A | 1/1998 | Alley et al. |
| 5,712,949 | A | 1/1998 | Kato et al. |
| 5,717,422 | A | 2/1998 | Fergason |
| 5,721,949 | A | 2/1998 | Smith et al. |
| 5,726,672 | A | 3/1998 | Hernandez et al. |
| 5,739,451 | A | 4/1998 | Winksy et al. |
| 5,740,143 | A | 4/1998 | Suetomi |
| 5,760,588 | A | 6/1998 | Bailey |
| 5,778,374 | A | 7/1998 | Dang et al. |
| 5,803,786 | A | 9/1998 | McCormick |
| 5,815,225 | A | 9/1998 | Nelson |
| 5,822,288 | A | 10/1998 | Shinada |
| 5,835,721 | A | 11/1998 | Donahue et al. |
| 5,835,732 | A | 11/1998 | Kikinis et al. |
| 5,838,969 | A | 11/1998 | Jacklin et al. |
| 5,864,868 | A | 1/1999 | Contois |
| 5,867,163 | A | 2/1999 | Kurtenbach |
| 5,870,710 | A | 2/1999 | Ozawa et al. |
| 5,918,303 | A | 6/1999 | Yamaura et al. |
| 5,920,728 | A | 7/1999 | Hallowell et al. |
| 5,923,757 | A | 7/1999 | Hocker et al. |
| 5,952,992 | A | 9/1999 | Helms |
| 6,006,274 | A | 12/1999 | Hawkins et al. |
| 6,009,237 | A | 12/1999 | Hirabayashi et al. |
| 6,011,585 | A | 1/2000 | Anderson |
| 6,018,705 | A | 1/2000 | Gaudet et al. |
| 6,041,023 | A | 3/2000 | Lakhansingh |
| 6,052,654 | A | 4/2000 | Gaudet et al. |
| 6,108,426 | A | 8/2000 | Stortz |
| 6,122,340 | A | 9/2000 | Darley et al. |
| 6,158,019 | A | 12/2000 | Squibb |
| 6,161,944 | A | 12/2000 | Leman |
| 6,172,948 | B1 | 1/2001 | Keller et al. |
| 6,179,432 | B1 | 1/2001 | Zhang et al. |
| 6,185,163 | B1 | 2/2001 | Bickford et al. |
| 6,191,939 | B1 | 2/2001 | Burnett |
| 6,208,044 | B1 | 3/2001 | Viswanadham et al. |
| 6,216,131 | B1 | 4/2001 | Liu et al. |
| 6,217,183 | B1 | 4/2001 | Shipman |
| 6,248,946 | B1 | 6/2001 | Dwek |
| 6,295,541 | B1 | 9/2001 | Bodnar et al. |
| 6,297,795 | B1 | 10/2001 | Kato et al. |
| 6,298,314 | B1 | 10/2001 | Blackadar et al. |
| 6,332,175 | B1 | 12/2001 | Birrell et al. |
| 6,336,365 | B1 | 1/2002 | Blackadar et al. |
| 6,336,727 | B1 | 1/2002 | Kim |
| 6,341,316 | B1 | 1/2002 | Kloba et al. |
| 6,357,147 | B1 | 3/2002 | Darley et al. |
| 6,377,530 | B1 | 4/2002 | Burrows |
| 6,452,610 | B1 | 9/2002 | Reinhardt et al. |
| 6,467,924 | B2 | 10/2002 | Shipman |
| 6,493,652 | B1 | 12/2002 | Ohlenbusch et al. |
| 6,536,139 | B2 | 3/2003 | Darley et al. |
| 6,549,497 | B2 | 4/2003 | Miyamoto et al. |
| 6,560,903 | B1 | 5/2003 | Darley |
| 6,587,403 | B1 | 7/2003 | Keller et al. |
| 6,587,404 | B1 | 7/2003 | Keller et al. |
| 6,605,038 | B1 | 8/2003 | Teller et al. |
| 6,606,281 | B2 | 8/2003 | Cowgill et al. |
| 6,611,607 | B1 | 8/2003 | Davis et al. |
| 6,611,789 | B1 | 8/2003 | Darley |
| 6,617,963 | B1 | 9/2003 | Watters et al. |
| 6,621,768 | B1 | 9/2003 | Keller et al. |
| 6,623,427 | B2 | 9/2003 | Mandigo |
| 6,631,101 | B1 | 10/2003 | Chan et al. |
| 6,693,612 | B1 | 2/2004 | Matsumoto et al. |
| 6,731,312 | B2 | 5/2004 | Robbin |
| 6,760,536 | B1 | 7/2004 | Amir et al. |
| 6,762,741 | B2 | 7/2004 | Weindorf |
| 6,781,611 | B1 | 8/2004 | Richard |
| 6,794,566 | B2 | 9/2004 | Pachet |
| 6,799,226 | B1 | 9/2004 | Robbin et al. |
| 6,801,964 | B1 | 10/2004 | Mahdavi |
| 6,832,373 | B2 | 12/2004 | O'Neill |
| 6,844,511 | B1 | 1/2005 | Hsu et al. |
| 6,870,529 | B1 | 3/2005 | Davis |
| 6,871,063 | B1 | 3/2005 | Schiffer |
| 6,876,947 | B1 | 4/2005 | Darley et al. |
| 6,882,955 | B1 | 4/2005 | Ohlenbusch et al. |
| 6,886,749 | B2 | 5/2005 | Chiba et al. |
| 6,898,550 | B1 | 5/2005 | Blackadar et al. |
| 6,911,971 | B2 | 6/2005 | Suzuki et al. |
| 6,918,677 | B2 | 7/2005 | Shipman |
| 6,931,377 | B1 | 8/2005 | Seya |
| 6,934,812 | B1 | 8/2005 | Robbin et al. |
| 6,950,087 | B2 | 9/2005 | Knox et al. |
| 7,010,365 | B2 | 3/2006 | Maymudes |
| 7,028,096 | B1 | 4/2006 | Lee |
| 7,046,230 | B2 | 5/2006 | Zadesky |
| 7,062,225 | B2 | 6/2006 | White |
| 7,076,561 | B1 | 7/2006 | Rosenberg et al. |
| 7,084,856 | B2 | 8/2006 | Huppi |
| 7,084,921 | B1 | 8/2006 | Ogawa |
| 7,092,946 | B2 | 8/2006 | Bodnar |
| 7,124,125 | B2 | 10/2006 | Cook et al. |
| 7,131,059 | B2 | 10/2006 | Obrador |
| 7,143,241 | B2 | 11/2006 | Hull |
| 7,146,437 | B2 | 12/2006 | Robbin et al. |
| 7,171,331 | B2 | 1/2007 | Vock et al. |
| 7,191,244 | B2 | 3/2007 | Jennings et al. |
| 7,213,228 | B2 | 5/2007 | Putterman et al. |
| 7,234,026 | B2 | 6/2007 | Robbin et al. |
| 7,277,928 | B2 | 10/2007 | Lennon |
| 7,301,857 | B2 | 11/2007 | Shah et al. |
| 7,356,679 | B1 | 4/2008 | Le et al. |
| 7,508,535 | B2 | 3/2009 | Hart et al. |
| 2001/0013983 | A1 | 8/2001 | Izawa et al. |
| 2001/0029178 | A1 | 10/2001 | Criss et al. |
| 2001/0037367 | A1 | 11/2001 | Iyer |
| 2001/0041021 | A1 | 11/2001 | Boyle et al. |
| 2001/0042107 | A1 | 11/2001 | Palm |
| 2002/0002413 | A1 | 1/2002 | Tokue |
| 2002/0013784 | A1 | 1/2002 | Swanson |
| 2002/0028683 | A1 | 3/2002 | Banatre et al. |
| 2002/0045961 | A1 | 4/2002 | Gibbs et al. |
| 2002/0046315 | A1 | 4/2002 | Miller et al. |
| 2002/0055934 | A1 | 5/2002 | Lipscomb et al. |
| 2002/0059440 | A1 | 5/2002 | Hudson et al. |
| 2002/0059499 | A1 | 5/2002 | Hudson |
| 2002/0090912 | A1 | 7/2002 | Cannon et al. |
| 2002/0116082 | A1 | 8/2002 | Gudorf |
| 2002/0116517 | A1 | 8/2002 | Hudson et al. |
| 2002/0122031 | A1 | 9/2002 | Maglio et al. |
| 2002/0123359 | A1 | 9/2002 | Wei et al. |
| 2002/0152045 | A1 | 10/2002 | Dowling et al. |
| 2002/0156833 | A1 | 10/2002 | Maurya et al. |
| 2002/0161865 | A1 | 10/2002 | Nguyen |
| 2002/0173273 | A1 | 11/2002 | Spurgat et al. |
| 2002/0189426 | A1 | 12/2002 | Hirade et al. |
| 2002/0189429 | A1 | 12/2002 | Qian et al. |
| 2002/0199043 | A1 | 12/2002 | Yin |
| 2003/0002688 | A1 | 1/2003 | Kanevsky et al. |
| 2003/0007001 | A1 | 1/2003 | Zimmerman |
| 2003/0018799 | A1 | 1/2003 | Eyal |
| 2003/0037254 | A1 | 2/2003 | Fischer et al. |
| 2003/0046434 | A1 | 3/2003 | Flanagin et al. |
| 2003/0050092 | A1 | 3/2003 | Yun |
| 2003/0074457 | A1 | 4/2003 | Kluth |
| 2003/0076301 | A1 | 4/2003 | Tsuk et al. |
| 2003/0076306 | A1 | 4/2003 | Zadesky |
| 2003/0079038 | A1 | 4/2003 | Robbin et al. |
| 2003/0095096 | A1 | 5/2003 | Robbin et al. |
| 2003/0097379 | A1 | 5/2003 | Ireton |
| 2003/0104835 | A1 | 6/2003 | Douhet |
| 2003/0127307 | A1 | 7/2003 | Liu et al. |
| 2003/0128192 | A1 | 7/2003 | van Os |
| 2003/0133694 | A1 | 7/2003 | Yeo |

| | | |
|---|---|---|
| 2003/0153213 A1 | 8/2003 | Siddiqui et al. |
| 2003/0156503 A1 | 8/2003 | Schilling, Jr. et al. |
| 2003/0167318 A1 | 9/2003 | Robbin et al. |
| 2003/0176935 A1 | 9/2003 | Lian et al. |
| 2003/0182100 A1 | 9/2003 | Plastina et al. |
| 2003/0221541 A1 | 12/2003 | Platt |
| 2003/0229490 A1 | 12/2003 | Etter |
| 2003/0236695 A1 | 12/2003 | Litwin, Jr. |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0210628 A1 | 10/2004 | Inkinen et al. |
| 2004/0216108 A1 | 10/2004 | Robbin |
| 2004/0224638 A1 | 11/2004 | Fadell et al. |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0060542 A1 | 3/2005 | Risan et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0146534 A1 | 7/2005 | Fong et al. |
| 2005/0149213 A1 | 7/2005 | Guzak et al. |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/0216855 A1 | 9/2005 | Kopra et al. |
| 2005/0218303 A1 | 10/2005 | Poplin |
| 2005/0234983 A1 | 10/2005 | Plastina et al. |
| 2005/0245839 A1 | 11/2005 | Stivoric et al. |
| 2005/0246324 A1 | 11/2005 | Paalasmaa et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2005/0270276 A1 | 12/2005 | Sugimoto et al. |
| 2006/0013414 A1 | 1/2006 | Shih |
| 2006/0025068 A1 | 2/2006 | Regan et al. |
| 2006/0026424 A1 | 2/2006 | Eto |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0088228 A1 | 4/2006 | Marriott et al. |
| 2006/0092122 A1 | 5/2006 | Yoshihara et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0190577 A1 | 8/2006 | Yamada |
| 2006/0190980 A1 | 8/2006 | Kikkoji et al. |
| 2006/0221057 A1 | 10/2006 | Fux et al. |
| 2006/0221788 A1 | 10/2006 | Lindahl et al. |
| 2006/0259758 A1* | 11/2006 | Deng et al. ............ 713/100 |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0089057 A1 | 4/2007 | Kindig |
| 2007/0106660 A1 | 5/2007 | Stern et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |
| 2010/0077338 A1 | 3/2010 | Matthews et al. |

FOREIGN PATENT DOCUMENTS

| | | |
|---|---|---|
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1289197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| GB | 2399639 | 5/2005 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| KR | 20010076508 | 8/2001 |
| WO | WO 95/16950 | 6/1995 |
| WO | WO 98/17032 | 4/1998 |
| WO | WO 99/28813 | 6/1999 |
| WO | WO 00/22820 | 4/2000 |
| WO | WO 01/33569 | 5/2001 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO 2004/084413 A2 | 9/2004 |
| WO | WO 2004/104815 | 12/2004 |
| WO | WO 2005/031737 | 4/2005 |
| WO | WO 2005/048644 | 5/2005 |
| WO | WO 2005/008505 | 7/2005 |

| | | |
|---|---|---|
| WO | WO 2005/109781 | 11/2005 |
| WO | WO 2006/040737 | 4/2006 |
| WO | WO 2006071364 | 6/2006 |

OTHER PUBLICATIONS

Office Action dated Jun. 2, 2009 in U.S. Appl. No. 11/530,773.
Office Action dated May 27, 2009 in U.S. Appl. No. 11/439,613.
Hart-Daves, Guy, "How to Do Everything with Your IPod & Mini IPod Mini", 2004, McGraw-Hill Professional, p. 33.
Office Action Dated Feb. 1, 2008 in U.S. Appl. No. 11/327,544.
Office Action dated Apr. 4, 2008 in U.S. Appl. No. 11/212,555.
International Search Report dated Dec. 5, 2007 in PCT Application No. PCT/US2007/004810.
"Apple Announces iTunes 2," Press Release, Apple Computer, Inc., Oct. 23, 2001.
"Apple Introduces iTunes / World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0" / MP3 Player and Encoder for Macintosh by Jeffrey Robbin, Bill Kincaid and Dave Heller, manual by Tom Negrino, published by Casady & Greene, Inc., 2000.
"12.1" 925 Candela Mobile PC", downloaded from LCDHardware.com on Dec. 19, 2002, http://www.lcdharware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi/Media Reporting and Convergence, 2 pgs, downloaded on May 9, 2005.
"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly/optical.com/membrane_switches.html.
"Public Safety Technologies Tracer 2000 Computer", downloaded Dec. 19, 2002, http://www.pst911.com/traver.html.
"Quicktime Movie Playback Programming Guide", Apple Computer, Inc., Aug. 11, 2005.
"Quicktime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&1c=en&ver=4001&template=pc3_1_1&z . . . .
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.

"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.
Adam C. Engst, "SoundJam Keeps on Jammin'," Jun. 19, 2000, http://db.tidbits.com/getbits.acgi?tbart=05988.
Alex Veiga, "AT&T Wireless Launching Music Service," Yahoo! Finance, Oct. 5, 2004, pp. 1/2.
Andrew Birrell, "Personal Jukebox (PJB)," Oct. 13, 2000, http://birrell.org/andrew/talks/pjb/overview.ppt.
Apple iPod Technical Specifications, iPod 20GB and 60GB Mac + PC, downloaded from http://www.apple.com/ipod/color/specs.html on Aug. 8, 2005.
Apple iTunes Smart Playlists, downloaded Apr. 5, 2005 from http://web.archive.org/web/20031002011316/www.apple.com/itunes/smartplaylists . . . pp. 1-2.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb/.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
De Herrera, Chris, "Microsoft ActiveSync 3.1," Version 1.02, Oct. 13, 2000.
iAP Sports Lingo 0x09 Protocol V1.00, May 1, 2006.
IEEE 1394—Wikipedia, 1995, http://www.wikipedia.org/wiki/Firewire.
International Search Report dated Feb. 4, 2003 in corresponding application No. PCT/US2002/033330.
International Search Report dated Jul. 10, 2007 in corresponding application No. PCT/US2006/048738.
International Search Report dated Apr. 5, 2006 from corresponding International Application No. PCT/US2005/038819.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report dated Nov. 24, 2006 in PCT Application No. PCT/US2005/046797.
International Search Report in corresponding European Application No. 06256215.2 dated Feb. 20, 2007.
International Search Report in Patent Application No. PCT/US2006/048738 dated Jan. 29, 2008.
International Search Report in Patent Application No. PCT/US2007/076889 dated Jan. 28, 2008.
International Search Report in Patent Application No. PCT/US2007/077020 dated Jan. 28, 2008.
Invitation to Pay Additional Fees and Partial Search Report for corresponding PCT Application No. PCT/US2005/046797 dated Jul. 3, 2006.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
iTunes, Wikipedia, the free encyclopedia; downloaded on Oct. 5, 2005, pp. 1-6.
Jabra Bluetooth Headset User Manual; GN Netcom A/s, 2005.
Jabra Bluetooth Introduction; GN Netcom A/S, Oct. 2004.

Jabra FreeSpeak BT200 User Manual; Jabra Corporation, 2002.

Kennedy, "Digital Data Storage Using Video Disc," IBM Technical Disclosure Bulletin, vol. 24, No. 2, Jul. 1981.

Miniman, "Applian Software's Replay Radio and Player v1.02," Product review, pocketnow.com, http://www.pocketnow.com/reviews/replay/replay.htm, Jul. 31, 2001.

Musicmatch, "Musicmatch and Xing Technology Introduce Musicmatch Jukebox," May 18, 1998, http://www.musicmatch.com/info/company/press/releases/?year=1998&release=2.

Nonhoff-Arps, et al., "Straßenmusik Portable MP3-Spieler mit USB-Anschluss," CT Magazin Fuer Computer Technik, Verlag Heinz Heise GMBH, Hannover DE, No. 25, Dec. 4, 2000.

Nutzel et al., "Sharing Systems for Future HiFi Systems", The Computer Society, Jun. 2004.

Office Action Dated Feb. 4, 2008 in U.S. Appl. No. 11/566,072.

Partial Search Report dated Sep. 6, 2007 in PCT Application No. PCT/US2007/004810.

Personal Jukebox (PJB), "Systems Research Center and PAAD," Compaq Computer Corp., Oct. 13, 2000, http://research.compaq.com/SRC/pjb/.

Peter Lewis, "Two New Ways to Buy Your Bits," CNN Money, Dec. 31, 2003, pp. 1/4.

Sastry, Ravindra Wadali. "A Need for Speed: A New Speedometer for Runners", submitted to the Department of Electrical Engineering and Computer Science at the Massachusetts Institute of Technology, May 28, 1999.

Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208/212.

SoundJam MP Plus, Representative Screens, published by Casady & Greene, Inc., Salinas, CA, 2000.

Specification Sheet, iTunes 2, Apple Computer, Inc., Oct. 31, 2001.

Spiller, Karen. "Low-decibel earbuds keep noise at a reasonable level", The Telegraph Online, dated Aug. 13, 2006, http://www.nashuatelegraph.com/apps/pbcs.dll/article?Date=20060813&Cate . . . Downloaded Aug. 16, 2006.

Steinberg, "Sonicblue Rio Car," Product Review, Dec. 12, 2000, http://electronics.cnet.com/electronics/0/6342420/1304/4098389.html.

Travis Butler, "Archos Jukebox 6000 Challenges Nomad Jukebox," Aug. 13, 2001, http://db.tidbits.com/getbits.acgi?tbart=06521.

Travis Butler, "Portable MP3: The Nomad Jukebox," Jan. 8, 2001, http://db.tidbits.com/getbits.acgi?tbart=06261.

U.S. Appl. No. 11/621,541, "Personalized Podcasting Podmapping" filed Jan. 9, 2007.

Waterproof Music Player with FM Radio and Pedometer User Manual, Oregon Scientific, 2005.

Written Opinion dated Dec. 5, 2007 in PCT Application No. PCT/US2007/004810.

Written Opinion in Patent Application No. PCT/US2006/048738 dated Jan. 29, 2008.

Written Opinion in Patent Application No. PCT/US2007/076889 dated Jan. 28, 2008.

Written Opinion in Patent Application No. PCT/US2007/077020 dated Jan. 28, 2008.

Written Opinion of the International Searching Authority dated Nov. 24, 2006 in PCT Application No. PCT/US2005/046797.

"Creative liefert erstes Portable Media Center aus" [Online] Sep. 2, 2004, Retrieved from the internet on Sep. 20, 2007 from http://www.golem.de/0409/33347.html>.

International Search Report dated Feb. 18, 2008 in Patent Application No. PCT/US2007/079766.

International Search Report Dated Sep. 27, 2007 in Application No. 05824296.7.

Office Action dated Feb. 20, 2008 in Japanese Application No. 2007-538196.

Office Action dated Feb. 25, 2008 in U.S. Appl. No. 11/749,599.

Office Action dated Mar. 4, 2008 from U.S. Appl. No. 10/973,657.

Partial International Search Report dated Feb. 1, 2008 in Patent Application No. PCT/US2007/010630.

Written Opinion dated Feb. 18, 2008 in Patent Application No. PCT/US2007/079766.

Search Report dated Mar. 20, 2008 in Patent Application No. PCT/US2007/077789.

Written Opinion dated Mar. 20, 2008 in Patent Application No. PCT/US2007/077789.

Notification of Reason for Rejection from Japanese Application No. 2003-539048 dated Nov. 27, 2007.

"Combination Belt Clip Leaf Spring and Housing Latch", Wandt et al.; Motorola Technical Developments, Motorola Inc. Schaumburg, IL. vol. 18, Mar. 1, 1993.

Invitation to Pay Additional Fees and Partial Search Report for PCT Application No. PCT/US2007/077160 dated Apr. 1, 2008.

Office Action in U.S. Appl. No. 11/212,555 dated Aug. 14, 2008.

Office Action dated May 30, 2008 in Chinese Patent Application No. 02825938.6.

Office Action in Japanese Patent Application No. 2008-045351 dated Aug. 12, 2008.

Search Report dated May 15, 2008 in PCT Application No. PCT/US2007/019578.

Written Opinion dated Jul. 7, 2008 in PCT Application No. PCT/US2007/076793.

Written Opinion dated Jun. 10, 2008 in PCT Application No. PCT/US2007/010630.

Written Opinion dated May 15, 2008 in PCT Application No. PCT/US2007/019578.

Yee et al., "Faceted Metadata for Image Search and Browsing." Association for Computing Machinery, Conference Proceedings, Apr. 5, 2003.

Office Action dated Jun. 17, 2008 in U.S. Appl. No. 11/212,313.

"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.

International Search Report dated Jul. 7, 2008 in PCT Application No. PCT/US2007/076793.

International Search Report dated Jun. 10, 2008 in PCT Application No. PCT/US2007/010630.

Office Action dated Jan. 26, 2009 in U.S. Appl. No. 11/373,468.

Kadir et al., "Adaptive Fast Playback-Based Video Skimming Using a Compressed-Domain Visual Complexity Measure", 2004 IEEE International Conference on Multimedia and Expo, pp. 2055-2058.

Office Action dated Oct. 16, 2008 in U.S. Appl. No. 11/327,544.

Office Action in European Patent Application No. 05 855 368.6 dated Nov. 20, 2008.

Office Action dated Dec. 15, 2008 in U.S. Appl. No. 11/212,313.

Notice of Allowance dated Dec. 18, 2008 in U.S. Appl. No. 11/212,555.

International Search Report dated Oct. 10, 2008 in PCT Application No. PCT/US2007/077160.

Written Opinion dated Oct. 10, 2008 in PCT Application No. PCT/US2007/077160.

Office Action dated Sep. 1, 2008 in EP Application No. 06 256 215.2.

Written Opinion dated Jan. 6, 2009 in Singapore Application No. 200701865-8.

Office Action dated Jun. 24, 2009 in U.S. Appl. No. 11/373,468.

Office Action dated May 11, 2009 in U.S. Appl. No. 11/680,580.

Notice of Allowance dated Apr. 21, 2009 in U.S. Appl. No. 11/327,544.

Office Action dated Mar. 30, 2009 in U.S. Appl. No. 11/515,270.

Office Action dated Apr. 9, 2009 in U.S. Appl. No. 11/583,199.

Notice of Allowance dated Jun. 15, 2009 in U.S. Appl. No. 11/212,313.

Office Action dated Jun. 22, 2009 in U.S. Appl. No. 11/515,270.

Office Action dated Jun. 24, 2009 in U.S. Appl. No. 11/519,352.

Office Action dated Mar. 24, 2010 in U.S. Appl. No. 11/583,199.

Office Action dated Mar. 25, 2010 in U.S. Appl. No. 11/297,032.

Office Action dated Mar. 10, 2010 in U.S. Appl. No. 11/583,327.

Office Action dated Mar. 9, 2010 in U.S. Appl. No. 11/519,352.

Office Action dated Mar. 11, 2010 in U.S. Appl. No. 11/830,746.

Office Action dated Mar. 4, 2010 in U.S. Appl. No. 11/324,863.

Office Action dated Sep. 10, 2009 in U.S. Appl. No. 11/746,548.

Office Action dated Dec. 16, 2009 in U.S. Appl. No. 11/746,548.

Office Action dated Sep. 3, 2009 in U.S. Appl. No. 11/324,863.

Office Action dated Sep. 2, 2009 in U.S. Appl. No. 11/515,270.

Office Action dated Nov. 16, 2009 in U.S. Appl. No. 11/439,613.

Office Action dated Feb. 3, 2010 in U.S. Appl. No. 11/439,613.
Office Action dated Dec. 14, 2009 in U.S. Appl. No. 11/535,646.
Office Action dated Oct. 16, 2009 in U.S. Appl. No. 11/583,199.
Office Action dated Oct. 23, 2009 in Chinese Application No. 200580048143.9.
Office Action dated Nov. 16, 2009 in U.S. Appl. No. 11/144,541.
Office Action dated May 29, 2009 in EP Application No. 06 847 856.9.
Office Action dated Dec. 11, 2009 in U.S. Appl. No. 11/519,352.
Examination Report dated Sep. 1, 2009 in Singapore Application No. 200701865-8.
Office Action dated Sep. 25, 2009 in Chinese Application No. 200610130904.1.
Notice of Allowance dated Feb. 4, 2010 in U.S. Appl. No. 11/535,646.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.
Korean Notice of Preliminary Rejection dated Nov. 26, 2010 from Korean Application No. 10-2009-7007384.
European Search Report dated Nov. 3, 2010 from European Application No. 10010059.3.
First Office Action in Chinese Patent Application No. 200780029672.3 dated Sep. 6, 2011.

* cited by examiner

Fig. 1

*Fig. 3*
*(media player application)*

*Fig. 2*
*(game application)*

PORTABLE MEDIA PLAYBACK DEVICE INCLUDING USER INTERFACE EVENT PASSTHROUGH TO NON-MEDIA-PLAYBACK PROCESSING

CROSS REFERENCE TO RELATED APPLICATIONS

This application is a continuation of and claims priority under 35 U.S.C. §120 to U.S. patent application Ser. No. 11/530,773 filed Sep. 11, 2006 and is hereby incorporated by reference.

BACKGROUND

Portable electronic devices for media playback are becoming ever more popular. For example, a very popular portable media player is the line of iPod® media players from Apple Inc. of Cupertino, Calif. In addition to media playback, the iPod® media players also provide non-media-playback capabilities, including game playing capabilities.

SUMMARY

The inventors have realized that it is desirable to create an integrated media playback and non-media-playback experience.

Methods of operating a portable electronics device can include integrated operation of media playback processing and non-media-playback processing (such as, for example, game processing). The method can include receiving an event corresponding to operation of a user interface item by a user of the portable electronics device. The received event can be provided to the non-media-playback processing. The non-media-playback processing can determine whether to cause an action corresponding to the provided received event with respect to the non-media-playback processing.

For an event determined by the non-media-playback processing to not cause an action corresponding to the provided received event with respect to the non-media-playback processing, the provided received event can be provided to the media playback processing. Typically, the operating performed by the media playback processing based on the event can be the processing that would otherwise be performed by the media playback processing if the non-media-playback processing was not even occurring.

DETAILED DESCRIPTION

Methods are described to handle UI events to a portable electronics device such that the UI events may be operated upon by media playback processing and non-media-playback processing, as appropriate. The media playback processing and the non-media-playback processing may occur, at least when considered at a macroscopic level, in parallel. For example, the media playback processing may include playback of songs, such as is a commonly-known function of an iPod® media player. In general, the media playback nominally occurs in a predictive manner and, while user interaction may affect the media playback audio (e.g., by a user activating a "fast forward" or other user interface item), the media playback nominally occurs in a predictive manner.

In one example, an event corresponding to operation of a user interface item by a user of the portable electronics device is received. The received event is provided to the non-media-playback processing. The non-media-playback processing includes processing to determine whether to cause an action corresponding to the provided received event, with respect to the non-media-playback processing. For an event determined by the non-media-playback processing to not cause an action corresponding to the received event with respect to the non-media-playback processing, the received event is provided to the media playback processing.

A game application is an example of non-media-playback processing. That is, the game application substantially operates responsive to game-playing actions of a user of the portable media player. In this respect, the game video is not nominally generated in a predictive manner, as is the case with media playback processing.

Figure 1:
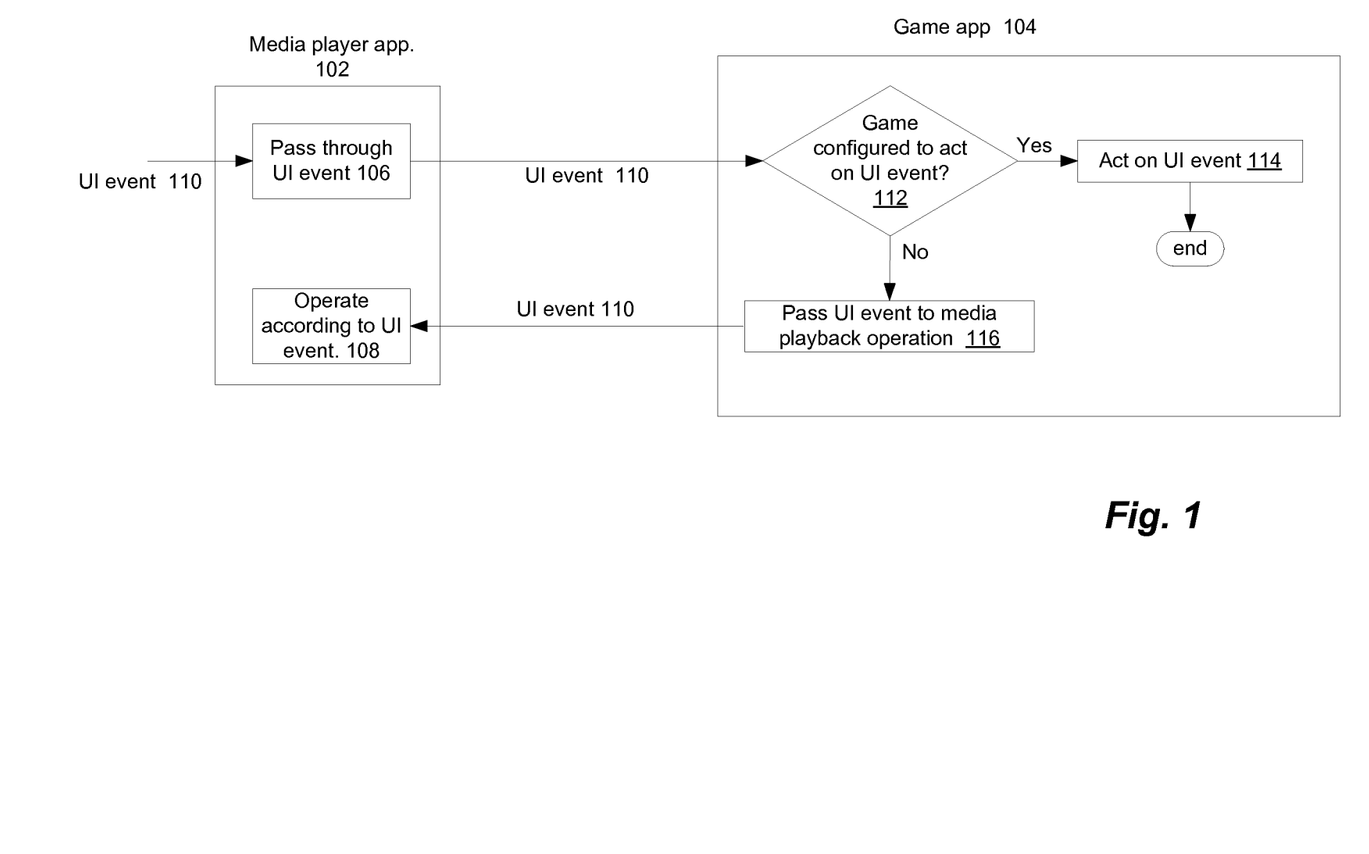
FIG. 1 is an architecture diagram broadly illustrating an example of processing to handle UI events to a portable electronics device such that the UI events may be operated upon by media playback processing and non-media-playback processing, as appropriate.

FIG. 1 is an architecture diagram broadly illustrating an example of this processing. As shown in FIG. 1, a user interface event 110 is received by the media player application 102 executing on a portable media player device. For example, the user interface event 110 is a result of a user interacting with a user interface (for example, a physical or virtual knob, switch etc.) of the portable media player. At step 106 of processing with the media player application 102, the media player application 102 passes through the UI event 110 to the non-media-playback application 104 (in this example, a game playing application).

At step 112, within the game playing application 104, the game playing application 104 determines whether it is configured to act on the UI event 110 that was passed to the game playing application 104 through the media player application 102. If the determination at step 112 is yes, then the UI event is acted upon at step 114, within the game playing application 104.

Otherwise, at step 116 within the game playing application 104, the UI event is passed back to the media player application 102. Then, at step 108 within the media player application 102, the UI event is acted upon by the media player application.

Figure 2:
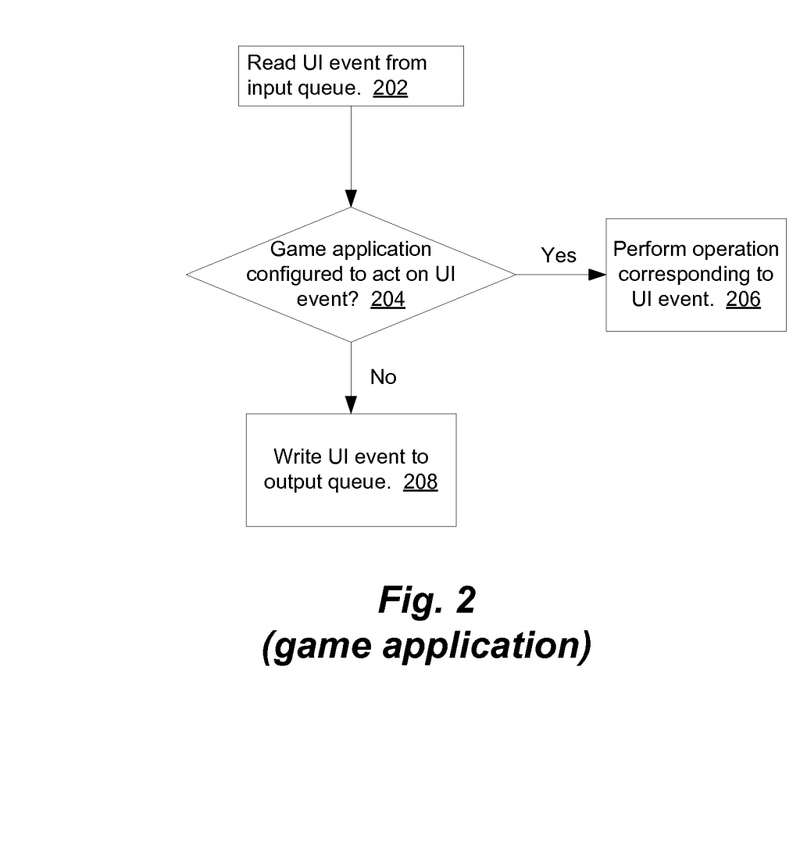
FIG. 2 is a flowchart illustrating processing within a non-media-playback (e.g., game) application.
Figure 3:
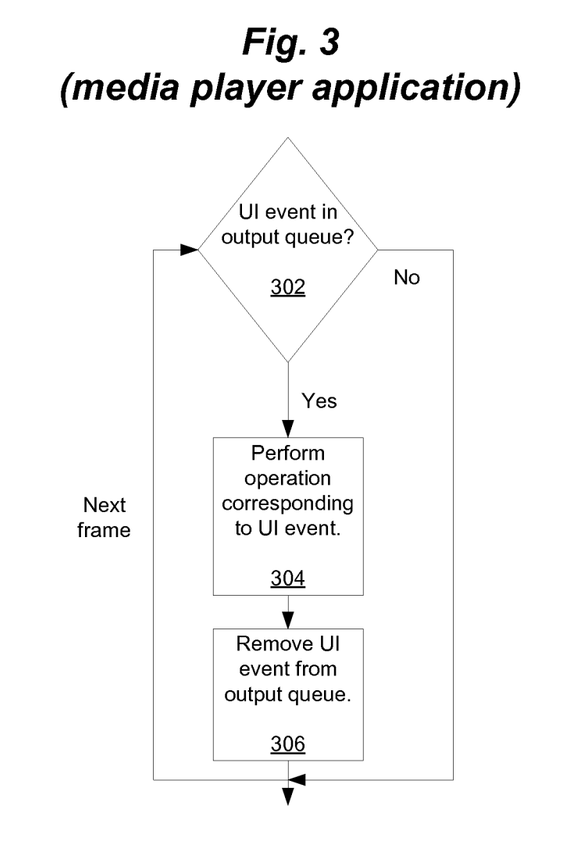
FIG. 3 is a flowchart illustrating processing of a media player application.

FIGS. 2 and 3 illustrate a particular implementation of the UI event processing, wherein an input queue and an output queue are employed for handling the UI events. FIG. 2 illustrates processing within the non-media-playback (e.g., game) application. At step 202, a UI event is read from an input queue. At step 204, the game application determines if it is configured to act on the UI event. If yes, the game application acts on the UI event at step 206. If no, the game application operates to write the UI event to an output queue.

Meanwhile, the media player application (FIG. 3) operates on a frame-by-frame basis. Within one frame of processing, step 302 (and, in some instances, discussed below), step 304 and step 306 are performed. At step 302, it is determined if there is a UI event in the output queue. (Remember, a UI event ends up in the output queue as a result of step 208 of the game application processing, where the game application is not configured to act on the UI event.) If, at step 302, there is not a UI event in the output queue, then processing returns to step 302, for a subsequent frame.

Otherwise, if at step 302 there is a UI event in the output queue, then an operation is performed, at step 304, corresponding to the UI event. At step 306, the just-processed UI event is removed from the output queue.

As an example, the UI event may correspond to the "next button up." For example, if a game or other non-media-playback processing is not configured to handle this event, then the media playback processing will perform a "standard" next command. This may include traversing to the next chapter, if playing a chaptered track such as a podcast or audiobook, or playing the next playable track in the "now playing" list. In other words, the typically, the operating performed by the media playback processing based on the event is the processing that would otherwise be performed by the media playback processing if the non-media-playback processing was not even occurring.

Thus, the non-media-playback processing can determine which events to handle, and other events can be passed back to the playback processing.

The following applications are incorporated herein by reference in their entirety: U.S. patent application Ser. No. 11/530,807, filed Sep. 11, 2006, entitled "TECHNIQUES FOR INTERACTIVE INPUT TO PORTABLE ELECTRONIC DEVICES,"; and U.S. patent application Ser. No. 11/530,846, filed Sep. 11, 2006, entitled "ALLOWING MEDIA AND GAMING ENVIRONMENTS TO EFFECTIVELY INTERACT AND/OR AFFECT EACH OTHER,".

What is claimed is:

1. A method, comprising:
receiving a user input event at a user interface of a portable electronic device, the portable electronic device operable in a predictive mode and a non-predictive mode, wherein the user input event is received by a media-playback a application of the portable electronic device;
transmitting the user in the media-playback application to a non-media-playback application of the portable electronic device for processing said user input event;
processing the user input event by the non-media-playback application, wherein the processing includes:
determining an operation associated with the received user input event;
determining if the operation is a non-predictive mode operation;
performing the non-predictive mode operation if the operation is determined as said non-predictive mode operation, otherwise,
automatically transmitting, without user intervention, the user input event to the media-playback application for performing a predictive mode operation;
wherein the operation is performed on the portable electronic device.

2. The method as recited in claim 1 wherein:
the portable includes a processor, the processor arranged to execute the non-media-playback application in the non-predictive mode and the media-play-back application in the predictive mode.

3. The method as recited in claim 2, further comprising:
providing an output queue;
writing the user input event to the output queue by the processor only when it is determined that the operation is the predictive mode operation.

4. The method as recited in claim 3, further comprising:
reading the output queue by the media-playback application; and
performing the predictive mode operation corresponding to the user input event written in the queue.

5. A portable electronic device operable in a predictive mode and a non-predictive mode, comprising:
a user interface, the user interface configured for receiving a user input event:
a processor in communication with the user interface, the processor configured to automatically operate the portable electronic device in the predictive mode or the non-predictive mode based upon the received user input event, wherein the processor configuration comprises:
receiving the user input event at the user interface, wherein the user input event is received by a media-playback application of the portable electronic device;
transmitting the user input event from the media-playback application to a non-media-playback application of the portable electronic device for processing said user input event;
processing the user input event by the non-media-playback application, wherein he processing includes:
determining an operation associated with the received user input event;
determining if the operation is a non-predictive mode operation; Performing the non-predictive mode operation if the operation is determined as said non-predictive mode operation, otherwise,
automatically transmitting, without user intervention, the user input event to the media-playback application for performing a predictive mode, operation;
wherein the operation is performed on the portable electronic device.

6. The portable electronic device as recited in claim 5, wherein the processor is arranged to execute the non-media-playback application in the non-predictive mode and the media-playback application in the predictive type mode.

7. The portable electronic device as recited in claim 6, further comprising:
an output queue, wherein the processor writes the user input event to the output queue only when it is determined that the operation is the predictive mode operation.

8. The portable electronic device as recited in claim 7, wherein the media-playback application instructs the processor to,
read the output queue, and
perform the predictive mode operation corresponding to the user input event written in the queue.

9. A non-transitory computer readable medium of a portable electronic device that provides instructions, that if executed by a processor of the portable electronic device will cause the processor to perform operations for automatically operating the portable electronic device in a predictive mode or a non-predictive mode, comprising:
receiving the user input event at a user interface of the portable electronic device, the portable electronic device operable in the predictive mode and a the non-predictive mode, wherein the user input event is received by a media-playback application of the portable electronic device;
transmitting the user input event from the media-playback application to a non-media-playback application of the portable electronic device for processing said user input event;
processing the user input event by the non-media-playback application, wherein the processing includes:
determining an operation associated with the received user input event;

determining if the operation is a non-predictive mode operation;

performing the non-predictive mode operation if the operation is determined as said non-predictive mode operation, otherwise, automatically transmitting, without user intervention, the user input event to the media-playback application for performing a predictive mode operation;

wherein the operation is performed on the portable electronic device.

10. The non transitory computer readable medium as recited in claim 9, wherein the non-predictive mode operation is performed by the non-media a back application and the predictive mode operation is performed by the media-playback application.

11. The non-transitory computer readable medium as recited in further comprising:

providing an output queue;

writing the user input event to the output queue only when it is determined that the operation is the predictive mode operation.

12. The non-transitory computer readable medium as recited in claim 11, wherein:

the media-playback application reads the output queue and performs the predictive mode operation corresponding to the user input event written in the queue.

13. The method as recited in claim 1, further comprising:

receiving the user input event from the non-media-playback application by the media-playback application and performing the predictive mode operation only if the user input event is transmitted from the non-media-playback application to the media-playback application.

14. The method as recited in claim 1, further comprising:

providing an input queue for handling user interface events, wherein the media-playback application transmits the user input event to the input queue for processing the user interface event.

15. The method as recited in claim 14, wherein:

the non-media-playback application receives the user input event from the input queue for processing the user interface event.

16. The method as recited in claim 1, further comprising:

providing an output queue for handling user interface events, wherein the non-media-playback application, upon determining the user input event includes a predictive mode operation, transmits the user input event to the media-playback application by employing the output queue.

17. The method as recited in claim 16, wherein:

the media-playback application receives the user input event from the output queue.

18. The device as recited as in claim 5, wherein the processor configuration further comprises:

receiving the user input event from the non-media-playback application by the media-playback application and performing the predictive mode operation only if the user input event is transmitted from the non-media-playback application to the media-playback application.

19. The device as recited in claim 5, wherein the processor configuration further comprises:

an input queue for handling user interface events, wherein the media-playback application transmits the user input event to the input queue for processing the user interface event.

20. The device as recited in claim 19, wherein:

the non-media-playback application receives the user input event from the input queue for processing the user interface event.

21. The device as recited in claim 5, wherein the processor configuration further comprises:

an output queue for handling user interface events, wherein the non-media-playback application, upon determining the user input event includes a predictive mode operation, transmits the user input event to the media-playback application by employing the output queue.

22. The device as recited in claim 21, wherein:

the media-playback application receives the user input event from the output queue.

23. The non-transitory computer readable medium as recited in claim 9, further comprising:

receiving the user input event from the non-media-playback application by the media-playback application and performing the predictive mode operation only if the user input event is transmitted from the non-media-playback application to the media-playback application.

24. The non-transitory computer readable medium as recited in claim 9, further comprising:

providing an input queue for handling user interface events, wherein the media-playback application transmits the user input event to the input queue for processing the user interface event.

25. The non-transitory computer readable medium as recited in claim 24 wherein:

the non-media-playback application receives the user input event from the input queue for processing the user interface event.

26. The non-transitory computer readable medium as recited in claim 9, further comprising:

providing an output queue for handling user interface events, wherein the non-media-playback application, upon determining the user input event includes a predictive mode operation, transmits the user input event to the media-playback application by employing the output queue.

27. The non-transitory computer readable medium as recited in claim 26, wherein:

the media-playback application receives the user input event from the output queue.

28. A non-transitory computer readable medium of a portable electronic device that provides instructions, that if executed by a processor of the portable electronic device will cause the processor to perform operations for automatically operating the portable electronic device in a predictive mode or a non-predictive mode, comprising:

receiving the user input event at a user interface of the portable electronic device, the portable electronic device operable in the predictive mode and the non-predictive mode, wherein the user input event is received by a first application of the portable electronic device;

transmitting the user input event from the first application to a second application of the portable electronic device for processing said user input event;

processing the user input event by the second application, wherein the processing includes:

determining an operation associated with the received user input event;

determining if the operation is a non-predictive mode operation;

performing the non-predictive mode operation if the operation is determined as said non-predictive mode operation, otherwise, automatically transmitting, without user intervention, the user input event to the first application for performing a predictive mode operation;

wherein the operation is performed on the portable electronic device.

29. The non-transitory computer readable medium as recited in claim 28, wherein the non-predictive mode operation is performed by the second application and the predictive mode operation is performed by the first application.

30. The non-transitory computer readable medium as recited in claim 29, further comprising:

providing an output queue;

writing the user input event to the output queue only when it is determined that the operation is the predictive mode operation.

31. The non-transitory computer readable medium as recited in claim 30, wherein:

the first application reads the output queue and performs the predictive mode operation corresponding to the user input event written in the queue.

32. The non-transitory computer readable medium as recited in claim 28, further comprising:

providing an input queue for handling user interface events, wherein the first application transmits the user input event to the input queue for processing the user interface event.

33. The non-transitory computer readable medium as recited in claim 32 wherein:

the second application receives the user input event from the input queue for processing the user interface event.

34. The non-transitory computer readable medium as recited in claim 28,further comprising:

providing an output queue for handling user interface events, wherein the second application, upon determining the user input event includes a predictive mode operation, transmits the user input event to the first application by employing the output queue.

35. The non-transitory computer readable medium as recited in claim 34, wherein:

the first application receives the user input event from the output queue.

36. A non-transitory computer readable medium of portable electronic device that provides instructions, that if executed by a processor of the portable electronic device will cause the processor to perform operations for automatically operating the portable electronic device in a predictive mode or a non-predictive mode, comprising:

receiving the user input event at a user interface of the portable electronic device, the portable electronic device operable in the predictive mode and the non-predictive mode, wherein the user input event is received by a first application of the portable electronic device;

transmitting the user input event from the first application to a second application of the portable electronic device for processing said user input event;

processing the user input event by the second application, wherein the processing includes:

determining an operation associated with the received user input event;

determining if the operation is a predictive mode or non-predictive mode operation that can executed by the second application;

performing the predictive or non-predictive mode operation if the operation is determined as one that can be executed by the second application, otherwise, automatically transmitting, without user intervention, the user input event to the first application for performing the predictive or non-predictive mode operation;

wherein the operation is performed on the portable electronic device.

37. The non-transitory computer readable medium as recited in claim 36, further comprising:

providing an output queue;

writing the user input event to the output queue only when it is determined that the operation cannot be executed by the second application.

38. The non-transitory computer readable medium as recited in claim 37, wherein:

the first application reads the output queue and performs the predictive mode operation or the non-predictive mode operation corresponding to the user input event written in the queue.

39. The non-transitory computer readable medium as recited in claim 36, further comprising:

providing an input queue for handling user interface events, wherein the first application transmits the user input event to the input queue for processing the user interlace event.

40. The non-transitory computer readable medium as recited in claim 39 wherein:

the second application receives the user input event from the input queue for processing the user interface event.

41. The non-transitory computer readable medium as recited in claim 36, further comprising:

providing an output queue for handling user interface events, wherein the second application, upon determining the user input event cannot be executed by the second application, transmits the user input event to the first application by employing the output queue.

42. The non-transitory computer readable medium as recited in claim 41, wherein:

the first application receives the user input event from the output queue.

* * * * *